United States Patent Office 3,525,555
Patented Aug. 25, 1970

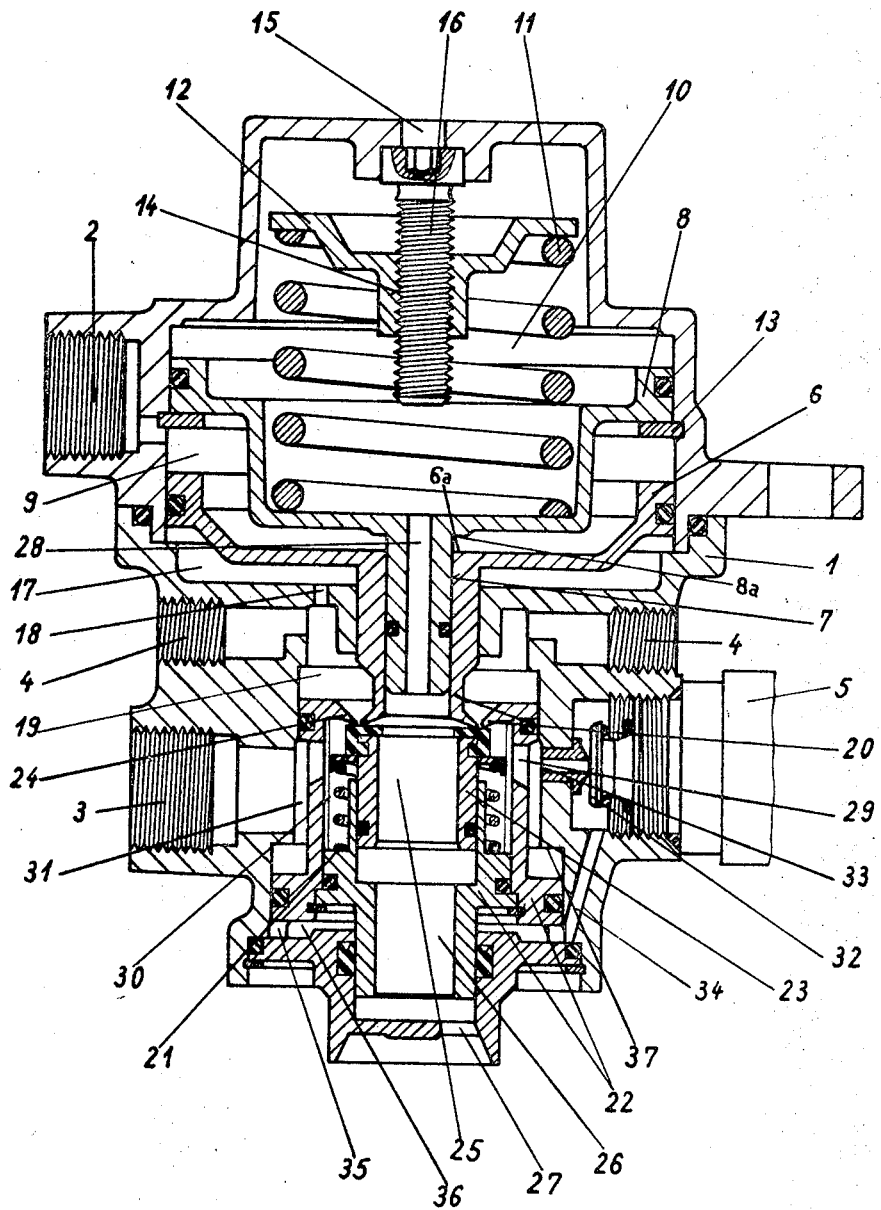

3,525,555
FLUID PRESSURE BRAKE CONTROL APPARATUS
Werner Meyer, Harenberg, and Gunter Braun, Ronnenberg, Germany, assignors to Westinghouse Bremsenund Apparatebau, G.m.b.H., Hannover, Germany
Filed Dec. 11, 1968, Ser. No. 783,008
Claims priority, application Germany, Dec. 22, 1967, W 41,311
Int. Cl. B60t 13/68
U.S. Cl. 303—40     3 Claims

ABSTRACT OF THE DISCLOSURE

Fluid pressure brake control apparatus having a relay valve device in which a piston operated exhaust valve unseats a supply valve relative to a supply valve seat to supply brake pressure to a brake cylinder, and an independently operable solenoid valve supplies pressure to a piston carrying the supply valve seat to unseat the valve seat relative to the supply valve. An adjustable spring loads an auxiliary piston disposed concentrically with the exhaust valve cylinder piston to cooperate with the first piston to control the pressure provided by the solenoid operated valve.

BACKGROUND OF INVENTION

Heretofore, multiple fluid pressure braking apparatus for vehicles has comprised a service brake apparatus having a relay valve, and a separately mounted independently operable supplemental braking apparatus serving as a holding brake or an emergency brake.

SUMMARY OF INVENTION

It is an object of the present invention to combine with the relay valve of the fluid pressure operated service brake apparatus a supplemental brake apparatus which operates the relay valve to perform supplemental braking independently of its normal service braking operation.

In the present invention this object is achieved by providing in the relay valve an auxiliary piston coaxially disposed with and normally axially displaced from the supply valve operating piston. An adjustable pressure spring means biases the auxiliary piston to a predetermined normal axial limit position in the piston chamber, each of the supply valve operating piston and the auxiliary piston carrying axial projections so that upon movement of the supply valve operating piston axially toward the auxiliary piston during lap operation of the relay valve, the projections will engage to couple the pistons as a unit opposed by the adjustable pressure spring. A service brake control pressure chamber between the pistons is communicated with service brake control pressure to move the supply valve operating piston to seat and unseat the supply relative to a supply valve seat. The supply valve seat is carried by a valve seat carrying piston subject to movement relative the supply valve in response to operation of a magnet valve which communicates or exhausts supply pressure on one side of the valve seat carrying piston.

This and other objects will become more readily apparent in the following description taken with the drawing, in which the single drawing figure comprises a cross-sectional view of a relay valve embodying the present invention.

Referring now to the drawing, there is shown a relay valve housing 1 having a number of passages therein, which are, a control pressure passage 2 which is connected to a conventional control valve, not shown, a supply passage 3 communicated with a supply reservoir, not shown, a delivery passage 4 in communication with a conventional brake cylinder, not shown, and an exhaust passage communicating with atmosphere. An electro-magnetically operated valve 5 is mounted in housing 1, the electrical connection between the valve 5 and a brake valve not being shown.

In the relay valve housing 1, there is disposed a main piston 6 having a central bore 7 in which there is disposed for axial movement an axial projection on an auxiliary piston 8, the respective diameters of the auxiliary piston and the main piston being substantially the same.

The space between the pistons 6 and 8 comprises a control chamber communicating with the previously described control passage 2. The main piston 6 and the auxiliary piston 8 are adapted to engage for unitary movement by means of projections 6a and 8a. In the chamber 10 above auxiliary piston 8 there is disposed an adjustable pressure spring 11 compressed between the auxiliary piston 8 and a spring disc or retainer 12 to normally urge the auxiliary piston 8 against housing projections 13. The spring retainer 12 is provided with a centrally disposed threaded bore 14 threadedly received on an axially rotatable adjusting screw 16 accessible to a tool which may be inserted through opening 15 in the housing 1.

Chamber 17, disposed below the main piston 6, is communicated with chamber 19 and brake cylinder passage 4 by way of passage 18. The main piston 6 carries an axial projection comprising an outlet valve 20 normally seated on one end of the double valve body 23 which is axially movable within piston 22 against bias spring 21, thus forming an outlet or exhaust valve comprised of valve 20 and valve body 23.

The aforementioned double valve body 23 forms with the inlet valve seat 24, carried by piston 22, an inlet or supply valve. The central passages 25 and 26 in the double valve body 23 and in the piston 22, respectively, communicate with exhaust opening 27. The aforementioned exhaust passages 25 and 26 cooperate with passage 28 in the auxiliary piston 8 to also communicate the aforementioned chamber 10 to exhaust.

The aforementioned piston 22 includes radial passages 29 for communicating chamber 30 within piston 22 with chamber 31 which, in turn, communicates with supply passage 3. A valve disc 32, which is moved to an open position upon energization of electro-magnetically operated valve 5, opens passage 33 communicating chamber 31 with passage 34 and chamber 35 below the piston 22.

The lower and upper limits of movement for the piston 22 are formed, respectively, by ribs 36 and projections 37 on the housing.

In now describing the operation of the relay valve, it will be assumed that the relay valve device is in the cut-off or lap position as shown in the drawing, that is, that both the inlet or supply valve 23, 24 and the outlet or exhaust valve 20, 23 are closed.

If now the service brake control pressure in passage 2 is increased, thus correspondingly increasing pressure in chamber 9, the main piston 6 is urged downwardly, effecting downward movement of double valve body 23 relative to piston 22 which rests on ribs 36 so that now the supply valve 23, 24 is opened. Under these conditions, supply fluid flows from supply passage 3 into chamber 19, and by means of delivery passage 4 into the brake cylinder. By means of passage 18, brake pressure also increases in chamber 17 urging main piston 6 upwardly in opposition to control pressure in chamber 17 until the supply valve 20, 23 is again in the closed position. The relay valve is now in the lap position preventing further increase in brake pressure in delivery passage 4. With each increase in control pressure chamber 9, the auxiliary piston 8 moves upwardly against the force of control spring 11, which movement of the auxiliary piston 8 has no effect upon the function of the relay valve in its service braking operation. With each increase in control pressure in passage 2, the above described sequence of operation is repeated.

If now the service control pressure in passage 2 is reduced, thereby reducing the pressure in chamber 9, the predominating pressure in chamber 17 urges the main piston 6 upwardly, thus raising exhaust valve seat 20 relative to double valve body 23 and exhausting brake pressure via passages 4, 25, 26 and 27 to atmosphere. At the same time, the pressure in chamber 17 is exhausted to atmosphere via passages 18, 25, 26 and 27 until the unbalanced pressure in control chamber 9 urges the piston 6 downwardly to close exhaust valve 20, 23. Under these conditions the relay valve is again in the lap position with the brake pressure in passage 4 corresponding to the reduced pressure in control chamber 9. With each additional reduction in control pressure the aforementioned sequence is repeated.

In now describing the operation of the holding of a supplemental brake, the electro-magnetic valve 5 is energized causing the armature thereof, not shown, to raise valve disc 32 relative to the opening of passage 33 so that fluid under pressure flows from supply passage 3 through chamber 31, passages 33 and 34 to chamber 35 below piston 22 causing piston 22 to move upwardly until engaged with projection 37, thus causing supply valve seat 24 to move upwardly relative to double valve body 23 which is held in the position shown by engagement of exhaust 20 therewith. The now open supply valve 23, 24 passes fluid under pressure from supply passage 3 to chamber 19 and delivery passage 4 to the brake cylinder. By means of passage 18, pressure in chamber 19 is passed to chamber 17 causing piston 6 to move upwardly until its projection 6a engages projection 8a of auxiliary piston 8.

The supply valve 23, 24 is opened at this time and the brake pressure in passage 4 further increases. As a result of such further increase in pressure in passage 4 and chamber 17, both pistons 6 and 8 are urged upwardly as a unit against the opposing force of spring 11 until the double valve body 23 seats on the supply valve seat 24. The brake pressure provided by operation of the electro-magnetic valve 5 is adjustable within the range of 0.5 to 1.5 atmospheres (7 p.s.i. to 21.4 p.s.i.) by axial adjustment of screw 16 by the insertion of a tool through housing opening 15.

If now the holding brake is to be released, the electro-magnetic valve 5 is deenergized to reseat valve disc 32 on passage 33 and to exhaust chamber 35 via passage 34 so that piston 22 moves downwardly to seat on ribs 36. The downward movement of piston 22 carries with it double valve body 23 effecting unseating relative to exhaust valve seat 20, thus exhausting the brake cylinder via passage 4, exhaust valve 20, 23, chamber 19 and passages 25, 26 and 27.

If the holding brake is actuated while the service brake operation is already in effect, the increase in control pressure in chamber 9 acts upon piston 6 at the same time as the piston 6 is loaded by the spring 11. So long as the control pressure in chamber 9 does not become greater than the pressure provided by energization of electro-magnetic valve 5, the piston 6 remains in the position assumed prior to application of service brake pressure in chamber 9, and the brake control pressure at delivery passage 4 remains unchanged as provided by energization of electro-magnetic valve 5.

If now the service brake control pressure in chamber 9 is increased to equal the holding brake pressure in chamber 17, the force of the pressure spring 11 and the pressure in chamber 17 are nullified so that any further increase in service brake control pressure in chamber 9 will control operation of the relay valve in the service brake operating mode.

If the control pressure in chamber 9 is increased to exceed the holding brake pressure in chamber 17, the piston moves downwardly to open the supply valve in the manner set forth in the above description of operation of the relay valve in service braking.

If the holding brake is actuated during service brake operation of the relay valve, valve disc 32 is unseated to pass fluid pressure from supply passage 3 to chamber 35 below piston 22 in the manner previously described. Accordingly, supply valve seat 24 is momentarily raised relative to double valve body 23, thus passing fluid under pressure from supply passage 3 to chamber 17, whereupon a minimal pressure increase in chamber 17 urges piston 6 upwardly until the double valve body 23 again seats on supply valve seat 24. Thereafter, in response to the now increased pressure in chamber 17 relative to chamber 9, piston 6 continues upward movement unseating exhaust valve seat 20 until the pressure in chamber 17 has reduced via passage 18 and exhaust passages 25, 26 and 27, to balance the pressure in chamber 9, whereupon the relay valve assumes the lap position.

From the foregoing description, it is apparent that the relay valve of the present invention provides a high degree of working accuracy in the lower range of braking pressures because of the large piston surfaces. In addition, the spring 11 governing the pressure provided by operation of the electro-magnetic valve 5 is so disposed in the relay valve that it has no effect on the service braking operation of the relay valve. Further, the arrangement of the adjusting screw in the upper part of the housing is such that condensate flow to the screw threads is prevented, thereby eliminating corrosion.

Having now described the invention, what we claim as new and desire to secure by Letters Patent, is:

1. Brake control apparatus, comprising:
   (a) a housing having a fluid pressure supply passage, a fluid pressure delivery passage, an exhaust passage and a service brake control passage therein;
   (b) a supply valve biased into seating engagement with a supply valve seat in said housing, said supply valve operable when unseated to communicate said fluid pressure supply passage with said fluid pressure delivery passage;
   (c) an exhaust valve movable in a first direction to seat on said supply valve, and upon further movement in said first direction to unseat said supply valve relative said supply valve seat, and upon movement in the reverse direction to reseat said supply valve and upon further movement in the reverse direction to unseat relative said supply valve to communicate said delivery passage to said exhaust passage;
   (d) a piston in said housing for moving said exhaust valve, one side of said piston communicated with said service brake control passage, the other side of said piston communicated with said delivery passage;
   (e) said supply valve seat carried by a second piston movable in said first and said reverse directions;
   (f) means for moving said second piston in said first and said reverse directions, said means including a valve means operable in a first mode to communicate said supply passage to one side of said second piston to move said piston in said reverse direction, and operable in a second mode to simultaneously sever said communication between said supply passage and said one side of said second piston and to communicate said one side of said second piston to exhaust.

2. Brake control apparatus, as recited in claim 1, in which:
   (a) an auxiliary piston is disposed coaxially relative said first piston;
   (b) spring means are disposed to bias said auxiliary piston in said first direction into engagement with piston stop means to normally provide space between said auxiliary piston relative said first piston;

(c) said brake control passage communicates with said space between said first and said auxiliarly piston; and (d) means on said first piston and said auxiliary piston normally disengaged and operable to effect coengagement when said piston moves in said reverse direction.

3. Brake apparatus, as recited in claim 2, in which, spring tension adjusting means are provided to adjust the bias on said spring means.

References Cited

UNITED STATES PATENTS

| 3,107,693 | 10/1963 | Puster et al. | 137—627.5 |
| 3,443,839 | 5/1969 | Hinrichs et al. | 303—40 X |
| 3,443,841 | 5/1969 | Kobnick | 303—40 X |

MILTON BUCHLER, Primary Examiner

J. J. McLAUGHLIN, Jr., Assistant Examiner

U.S. Cl. X.R.

137—627.5; 303—15, 56